(12) United States Patent
Svendsen

(10) Patent No.: US 7,747,574 B1
(45) Date of Patent: Jun. 29, 2010

(54) SYSTEM AND METHOD FOR ARCHIVING DIGITAL MEDIA

(75) Inventor: Hugh Svendsen, Chapel Hill, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 215 days.

(21) Appl. No.: 11/229,979

(22) Filed: Sep. 19, 2005

(51) Int. Cl.
G06F 7/00 (2006.01)
G06F 17/00 (2006.01)
G06F 12/00 (2006.01)
G06F 17/30 (2006.01)

(52) U.S. Cl. ........................ 707/640; 707/647; 707/653; 707/661; 707/665; 707/667; 707/821

(58) Field of Classification Search ........................ None
See application file for complete search history.

(56) References Cited

U.S. PATENT DOCUMENTS

| | | | |
|---|---|---|---|
| 5,760,917 A | 6/1998 | Sheridan ..................... 358/442 |
| 6,016,478 A | 1/2000 | Zhang et al. |
| 6,301,586 B1 | 10/2001 | Yang et al. .................. 707/104 |
| 6,314,408 B1 | 11/2001 | Salas et al. ..................... 705/54 |
| 6,574,629 B1 | 6/2003 | Cooke, Jr. et al. ............. 707/10 |
| 6,578,072 B2 | 6/2003 | Watanabe et al. ........... 709/217 |
| 6,583,799 B1 | 6/2003 | Manolis et al. |
| 6,629,100 B2 | 9/2003 | Morris et al. .................. 707/10 |
| 6,629,104 B1 | 9/2003 | Parulski et al. .............. 707/102 |
| 6,636,259 B1 | 10/2003 | Anderson et al. ......... 348/211.3 |
| 6,671,424 B1 | 12/2003 | Skoll et al. .................. 382/305 |
| 6,675,205 B2 * | 1/2004 | Meadway et al. ........... 709/219 |
| 6,757,684 B2 | 6/2004 | Svendsen et al. .............. 707/10 |
| 6,804,684 B2 | 10/2004 | Stubler et al. ............ 707/104.1 |
| 6,839,721 B2 * | 1/2005 | Schwols ....................... 707/200 |
| 6,857,053 B2 * | 2/2005 | Bolik et al. .................. 711/162 |
| 6,871,231 B2 | 3/2005 | Morris ........................ 709/225 |
| 6,904,160 B2 | 6/2005 | Burgess ....................... 382/113 |
| 6,947,959 B1 | 9/2005 | Gill |
| 6,976,028 B2 | 12/2005 | Fenton et al. |
| 6,976,090 B2 | 12/2005 | Ben-Shaul et al. |
| 7,117,453 B2 | 10/2006 | Drucker et al. |
| 7,263,562 B2 | 8/2007 | De Vorchik et al. |
| 2002/0087546 A1 | 7/2002 | Slater et al. .................... 707/10 |
| 2002/0188602 A1 | 12/2002 | Stubler et al. .................. 707/3 |
| 2003/0018802 A1 * | 1/2003 | Romanik et al. ............ 709/234 |
| 2003/0052897 A1 | 3/2003 | Lin |
| 2003/0074373 A1 | 4/2003 | Kaburagi et al. ......... 707/104.1 |
| 2003/0131002 A1 | 7/2003 | Gennetten et al. ............. 707/10 |
| 2003/0172297 A1 | 9/2003 | Gunter |
| 2004/0024739 A1 * | 2/2004 | Copperman et al. ............ 707/1 |
| 2004/0103203 A1 | 5/2004 | Nichols et al. |

(Continued)

*Primary Examiner*—Charles Rones
*Assistant Examiner*—Charles D Adams
(74) *Attorney, Agent, or Firm*—Withrow & Terranova, PLLC

(57) ABSTRACT

A network based system for archiving digital assets based on keywords associated with the digital assets is provided. In general, digital assets residing at a client node are each tagged with one or more keywords. One or more of the keywords are then identified as archiving keywords, thereby creating a list of archiving keywords. The list of archiving keywords is provided from the client node to a central node. The central node then provides a request to the client node for the digital assets tagged with the keywords in the list of archiving keywords. In response, the client node uploads the digital assets tagged with the keywords in the list of archiving keywords to the central node.

16 Claims, 8 Drawing Sheets

U.S. PATENT DOCUMENTS

| | | |
|---|---|---|
| 2004/0111415 A1 | 6/2004 | Scardino et al. ............... 707/10 |
| 2004/0139172 A1 | 7/2004 | Svendsen et al. |
| 2004/0145660 A1* | 7/2004 | Kusaka .................... 348/211.2 |
| 2004/0172451 A1 | 9/2004 | Biggs et al. ................. 709/206 |
| 2004/0201692 A1 | 10/2004 | Parulski et al. ........... 348/207.1 |
| 2004/0230663 A1 | 11/2004 | Ackerman ................. 709/207 |
| 2004/0260679 A1 | 12/2004 | Best et al. |
| 2005/0015389 A1 | 1/2005 | Novak et al. |
| 2005/0044483 A1 | 2/2005 | Maze et al. .............. 715/501.1 |
| 2005/0052685 A1 | 3/2005 | Herf et al. |
| 2005/0060299 A1 | 3/2005 | Filley et al. .................... 707/3 |
| 2005/0060356 A1* | 3/2005 | Saika ......................... 707/204 |
| 2005/0091289 A1 | 4/2005 | Shappell et al. |
| 2005/0097173 A1 | 5/2005 | Johns et al. .................. 709/206 |
| 2005/0131871 A1 | 6/2005 | Howard et al. |
| 2005/0190273 A1 | 9/2005 | Toyama et al. |
| 2005/0273476 A1* | 12/2005 | Wertheimer et al. ........ 707/204 |
| 2006/0085490 A1* | 4/2006 | Baron et al. ................ 707/200 |
| 2006/0253434 A1 | 11/2006 | Beriker et al. |
| 2007/0016575 A1* | 1/2007 | Hurst-Hiller et al. ........... 707/5 |
| 2007/0073694 A1 | 3/2007 | Picault et al. |
| 2007/0168463 A1 | 7/2007 | Rothschild |

* cited by examiner

SYSTEM AND METHOD FOR ARCHIVING DIGITAL MEDIA

FIELD OF THE INVENTION

The present invention relates to a network based system for archiving digital assets, such as digital images, video, audio, and the like.

BACKGROUND OF THE INVENTION

Digital cameras have become commonplace to today's society and enable a user to accumulate large collections of digital images and video. Due to the file sizes of the digital images and videos, it has become difficult for a user to efficiently and effectively archive his or her collection. As a result, network based archiving systems are starting to gain acceptance.

One example of a network based archiving system is a centrally hosted photosharing system. These centrally hosted photosharing systems include a central server, and a limited amount of storage space at the central server is allocated to each of a number of users. However, one issue with these systems is that each user must select the digital images and videos that are desired to be stored at the central server from his collection and initiate the upload to the central server. If a user adds a new image or video to his collection that he desires to store at the central server, the user must again select the new image or video and initiate the upload to the central server. Another issue with typical centrally hosted photosharing systems is that they do not provide an effective means for handling the situation where the user has reached his storage limit.

Thus, there remains a need for an improved network based system for archiving digital assets, such as digital images, video, audio, and the like.

SUMMARY OF THE INVENTION

The present invention provides a network based system for archiving digital assets based on keywords associated with the digital assets. In general, digital assets residing at a client node are each tagged with keywords. One or more of the keywords are then identified as archiving keywords, thereby creating a list of archiving keywords. The list of archiving keywords is provided from the client node to a central node. The central node then provides a request to the client node for the digital assets tagged with the keywords in the list of archival keywords. In response, the client node uploads the digital assets tagged with the keywords in the list of archiving keywords to the central node.

At some point after the upload is complete, additional digital assets may be tagged with keywords from the list of archiving keywords. If so, either the client node notifies the central node of the additional digital assets or the central node polls the client node to determine if there are additional digital assets to upload. In either case, the central node requests the additional digital assets from the client node. In response, the client node sends a storage space requirement for the additional digital assets to the central node. Based on the storage space requirement for the additional digital assets and a storage space occupied by the digital assets previously uploaded from the client node and stored at the central node, the central node determines whether a storage limit associated with the owner of the digital assets will be exceeded by the upload. If so, the central node performs at least one action such that the storage limit will not be exceeded by the upload. Thereafter, additional digital assets are uploaded and stored at the central node.

If a new keyword is added to the list of archiving keywords, the central node requests additional digital assets tagged with the new keyword. In response, the client node sends the storage requirement for the additional digital assets to the central node. Based on the storage space requirement for the additional digital assets and a storage space occupied by the digital assets previously uploaded from the client node and stored at the central node, the central node determines whether a storage limit associated with the owner of the digital assets will be exceeded by the upload. If so, the central node performs at least one action such that the storage limit will not be exceeded by the upload. Thereafter, additional digital assets are uploaded and stored at the central node.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for archiving digital assets such as, but not limited to, digital images, video, audio, and the like. Accordingly, while this description focuses on the archival of digital images, the present invention is not limited thereto.

Figure 1:
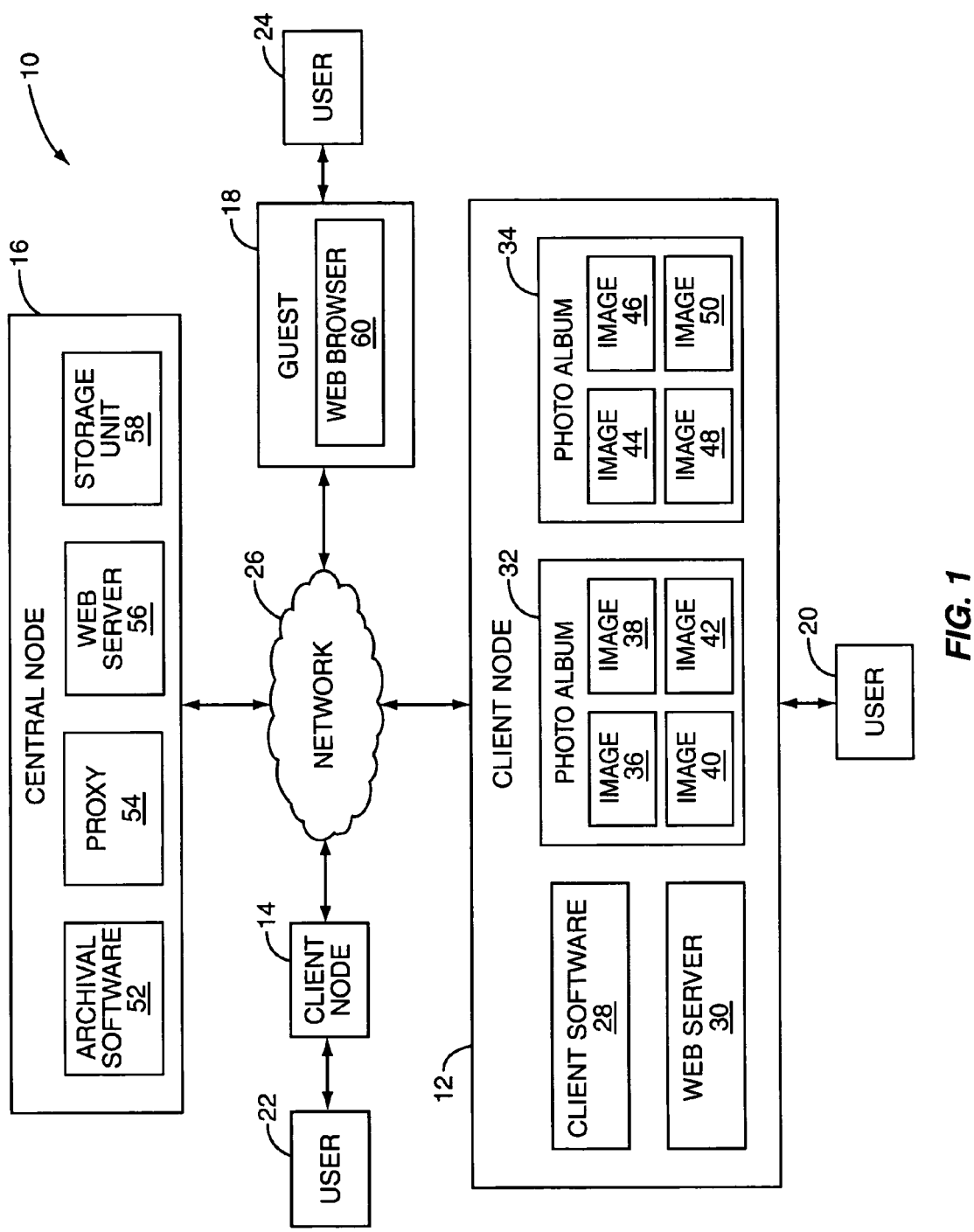
FIG. 1 illustrates one embodiment of a network based archival system operating to archive digital assets based on keywords associated with the digital assets according to one embodiment of the present invention.

FIG. 1 illustrates an exemplary peer-to-peer (P2P) sharing system 10 according to one embodiment of the present invention. In this embodiment, the archival system of the present invention is incorporated into the P2P sharing system 10. However, the present invention may also be incorporated into a centrally hosted sharing system or implemented as a standalone system. As illustrated, the system 10 includes client nodes 12 and 14, a central node 16, guest node 18, users 20 and 22 associated with the client nodes 12 and 14, user 24 associated with the guest node 18, and network 26. Preferably, the network 26 is the Internet. There may be any number of client nodes 12, 14 and guest nodes 18.

In general, the client nodes 12 and 14 are personal computers, mobile terminals, Personal Digital Assistants, or the like having access to the network 26. The client node 12 includes client software 28, web server 30, and photo albums 32 and 34. It should be noted that the discussion herein of the client node 12 is equally applicable to the client node 14. The photo album 32 includes digital images 36-42, and the photo album 34 includes digital images 44-50. Although two photo albums each having four digital images are illustrated, the client node 12 may include any number of photo albums, and the photo albums may include any number of digital images. Further, each of the digital images 36-42 and 44-50 may be included within any number of photo albums 32, 34. For example, the digital image 36 may be included within both of the photo albums 32 and 34. Also, in another embodiment, the digital images 36-50 reside at the client node 12 and are not organized into photo albums.

The central node 16 includes archival software 52, a proxy 54, a web server 56, and a storage unit 58. The proxy 54 and the web server 56 may be implemented in software. The storage unit 58 may include any number of storage devices such as, but not limited to, disc drives. The guest node 18 is also a personal computer, mobile terminal, Personal Digital Assistant, or the like having access to the network 26 and preferably includes a web browser 60.

Before discussing the details of the present invention, a general overview of the operation of system 10 may be beneficial. In general, the user 20 at the client node 12 may invite a number of guests such as the user 24 associated with the guest node 18 or the user 22 associated with the client node 14 to view the photo album 32 residing at the client node 12. Assuming that the user 24 associated with the guest node 18 is invited to view the photo album 32, the web browser 60 at the guest node 18 sends a request for the photo album 32 to the central node 16. The proxy 54 receives the request and communicates with the client node 12 to obtain the photo album 32. Thereafter, the central node 16, and specifically the proxy 54 provides the photo album 32 to the web browser 60 at the guest node 18 for viewing by the user 24. For a more detailed description of an exemplary P2P system, the interested reader is directed to commonly owned and assigned U.S. patent application Ser. No. 10/813,839, entitled METHOD AND SYSTEM FOR PROVIDING WEB BROWSING THROUGH A FIREWALL IN A PEER TO PEER NETWORK, filed on Mar. 31, 2004, currently pending, which is hereby incorporated by reference in its entirety.

According to the present invention, the system 10 also provides archiving of digital assets, such as the digital images 36-50, at the central node 16 based on keywords associated with the digital assets. More specifically, the user 20 interacts with the client software 28 to define a list of keywords to be used to tag the digital images 36-50. For example, the keywords may include "work," "family," "kids," "vacation," "parties," "friends," "camera phone," and the like. The user 20 then interacts with the client software 28 to tag each of the digital images 36-50 with one or more keywords on either a per image basis or a per album basis, as discussed below in more detail.

Thereafter, the user 20 further interacts with the client software 28 to identify one or more of the keywords used to tag the digital images 36-50 as archiving keywords, thereby creating a list of archiving keywords. As described below, the ones of the digital images 36-50 tagged with one or more of the archiving keywords will subsequently be uploaded to the central node 16 and stored in the storage unit 58. In addition, the user 20 interacts with the client software 28 to define archival policies for each of the archiving keywords. The archival policies for each of the archiving keywords may include a priority and an action for the central node 16 to take if a storage space allocated to the user 20 at the central node 16 is or will be exceeded. For example, the action for the central node 16 to take if the user 20 has or will exceed his storage limit may be moving the digital images tagged by the keyword to a secondary storage device; resizing or decreasing the resolution of the digital images tagged by the keyword; converting the digital images tagged by the keyword to a different file type and moving the converted digital images to a secondary storage device; deleting the digital images tagged by the keyword; or moving the digital images tagged by the keyword to a backup media such as a Digital Video Disc (DVD), Compact Disc (CD), or the like, and sending the media to the user 20.

The client node 12 sends the list of archiving keywords and the archival policies to the central node 16. In response, the archival software 52 stores the list of archiving keywords and the archival policies and requests the digital images tagged with any one of the keywords in the list of archiving keywords from the client node 12. The client software 28 identifies the ones of the digital images 36-50 tagged with one or more of the archiving keywords as digital images to upload. Before beginning the upload, the client software 28 determines the storage space requirements of the digital images to upload and sends the storage space requirements to the archival software 52 at the central node 16. The storage space requirements may be the combined file size of the digital images to upload.

Upon receiving the storage space requirements, the central node 16, and specifically the archival software 52, determines whether the storage capacity allocated to the user 20 will be exceeded by the upload. More specifically, the archival software 52 determines whether the storage space currently used by the user 20 plus the storage space requirements for the digital images to upload exceeds the storage space allocated to the user 20. Assuming that the storage space allocated to the user 20 will not be exceeded, the archival software 52 communicates with the client software 28 to upload the digital images from the client node 12 to the central node 16 and stores the digital images in the storage unit 58. In one embodiment, the client software 28 includes a background process, or daemon, that communicates with the archival software 52 to effectuate the upload of the digital images.

Subsequently, if the user 20 adds an archiving keyword or if additional digital images are tagged with one of the archiving keywords, another upload is initiated. Again, the storage space requirements for the upload are sent to the central node 16, and the archival software 52 determines whether the storage space allocated to the user 20 will be exceeded. Assuming that the archival software 52 determines that the storage space allocated to the user 20 will be exceeded, the archival software 52 determines what action to take based on the archival policies for the keywords in the list of archiving keywords. For example, the action may be to move the digital images associated with a keyword having a lowest priority to a secondary storage device. As a result, the storage space currently used by the user 20 is reduced. The archival software 52 continues to take actions based on the archival policies until the upload will no longer exceed the storage space allocated to the user 20. Thereafter, the archival software 52 communicates with the client software 28 to upload the additional digital images and stores the additional digital images in the storage unit 58.

Figure 2:
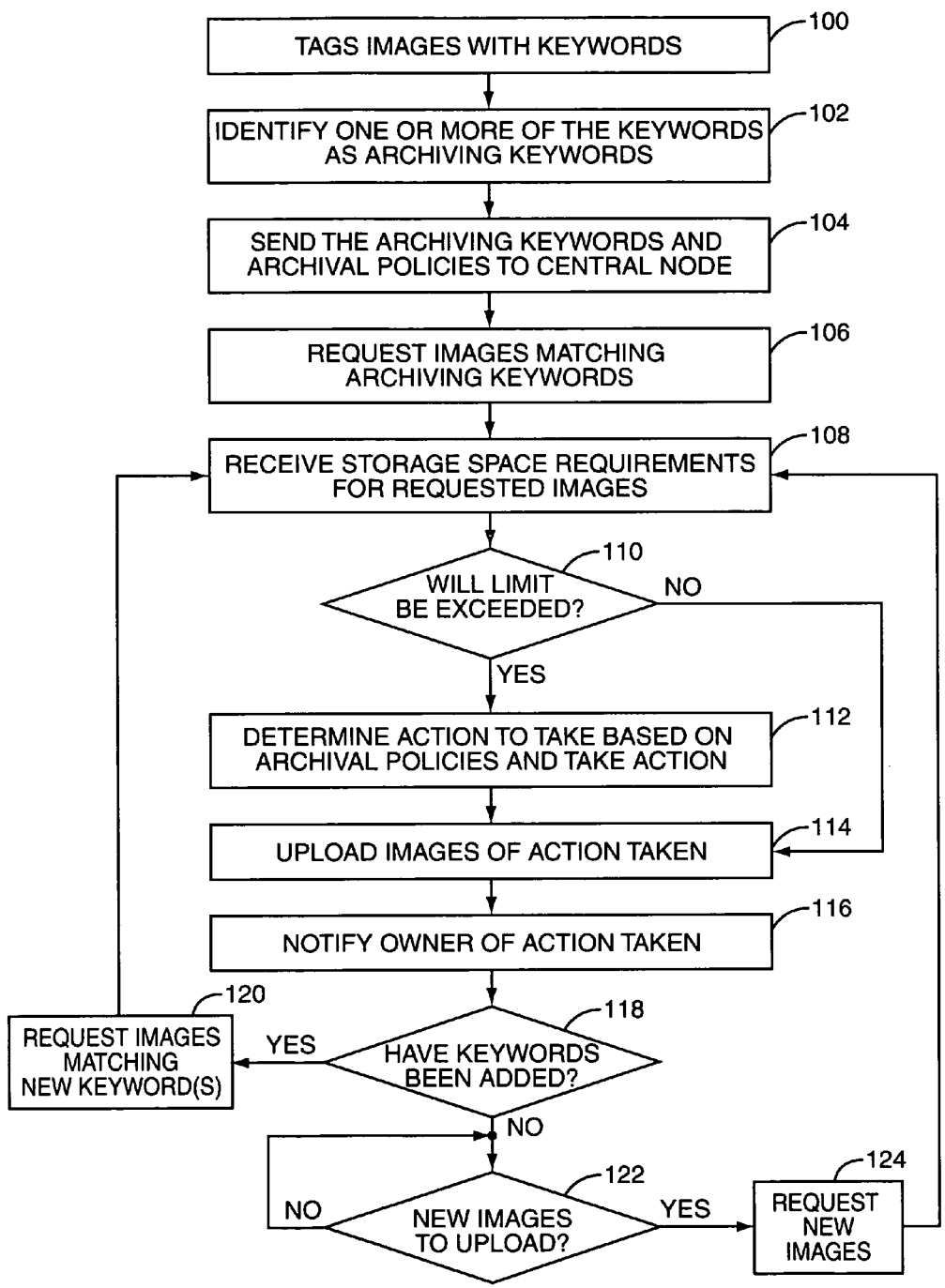
FIG. 2 is a basic flow chart illustrating the operation of the system of FIG. 1 according to one embodiment of the present invention.

FIG. 2 is a basic flow chart illustrating the operation of the P2P sharing system 10 of FIG. 1 according to one embodiment of the present invention. First, the user 20 interacts with the client software 28 at the client node 12 to tag each of the digital images 36-50 with one or more keywords (step 100). Prior to tagging the digital images 36-50 with keywords, the user 20 may define a list of keywords including the keywords to be used to tag the digital images 36-50.

Figure 3:
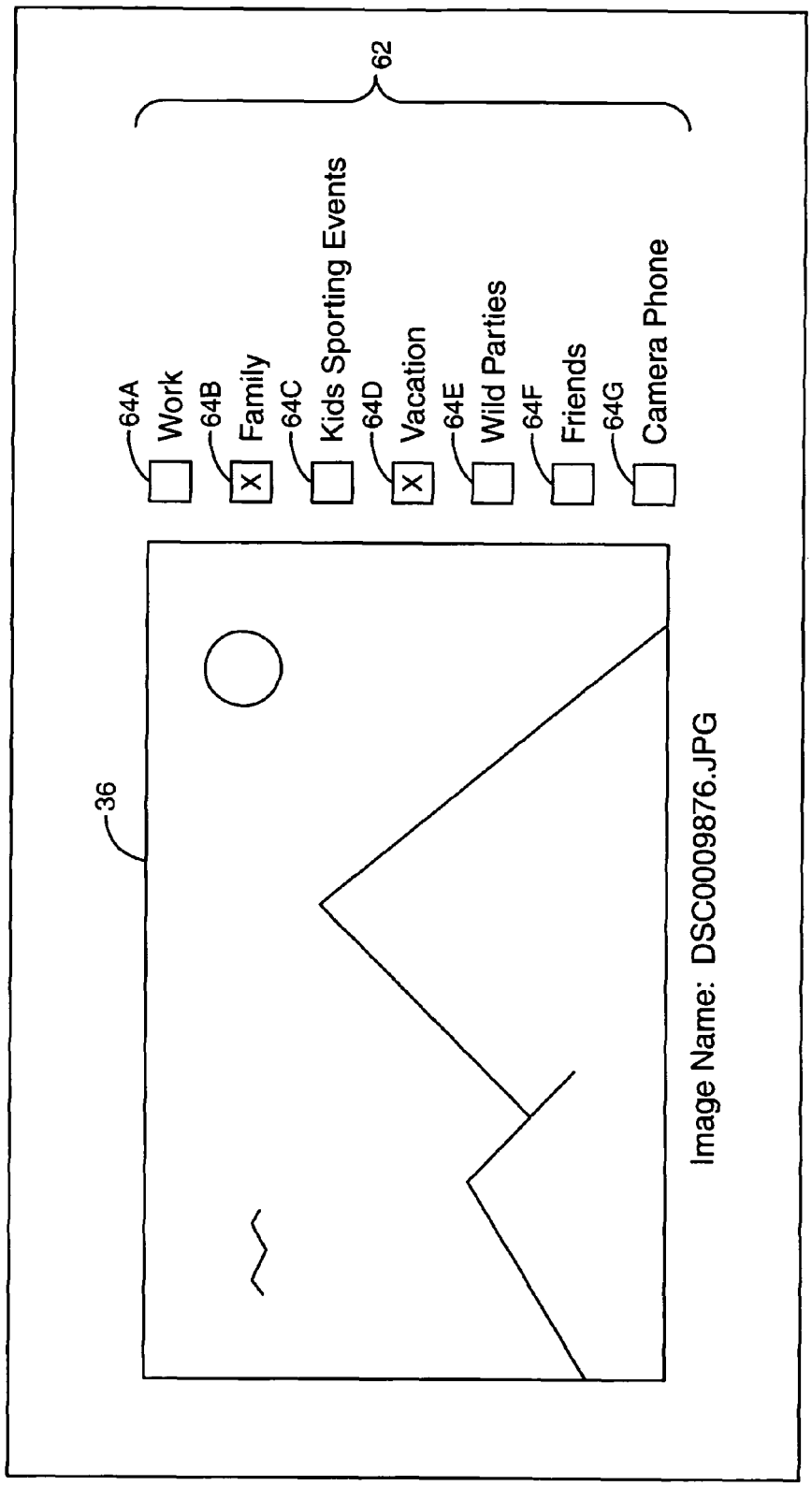
FIG. 3 illustrates an exemplary user interface for tagging digital images with one or more keywords on a per image basis.

The digital images 36-50 may be tagged with keywords on a per album basis or on a per image basis. FIG. 3 illustrates an exemplary user interface for tagging the digital images 36-50 on a per image, or per asset, basis. More specifically, FIG. 3 illustrates a user interface for tagging the digital image 36 with one or more keywords. In this example, the digital image 36 is displayed to the user 20 along with the list 62 of the keywords. The keywords are associated with check boxes 64A-64G. The user 20 selects which of the keywords are to be associated with the digital image 36 by, for example, checking the check boxes 64A-64G next to the desired keywords. In this example, the keywords "family" and "vacation" are selected by checking check boxes 64B and 64D. Thereafter, the digital image 36 is associated with the selected keywords by, for example, storing the selected keywords in metadata associated with the digital image 36 or in an application file associated with the client software 28.

Figure 4:
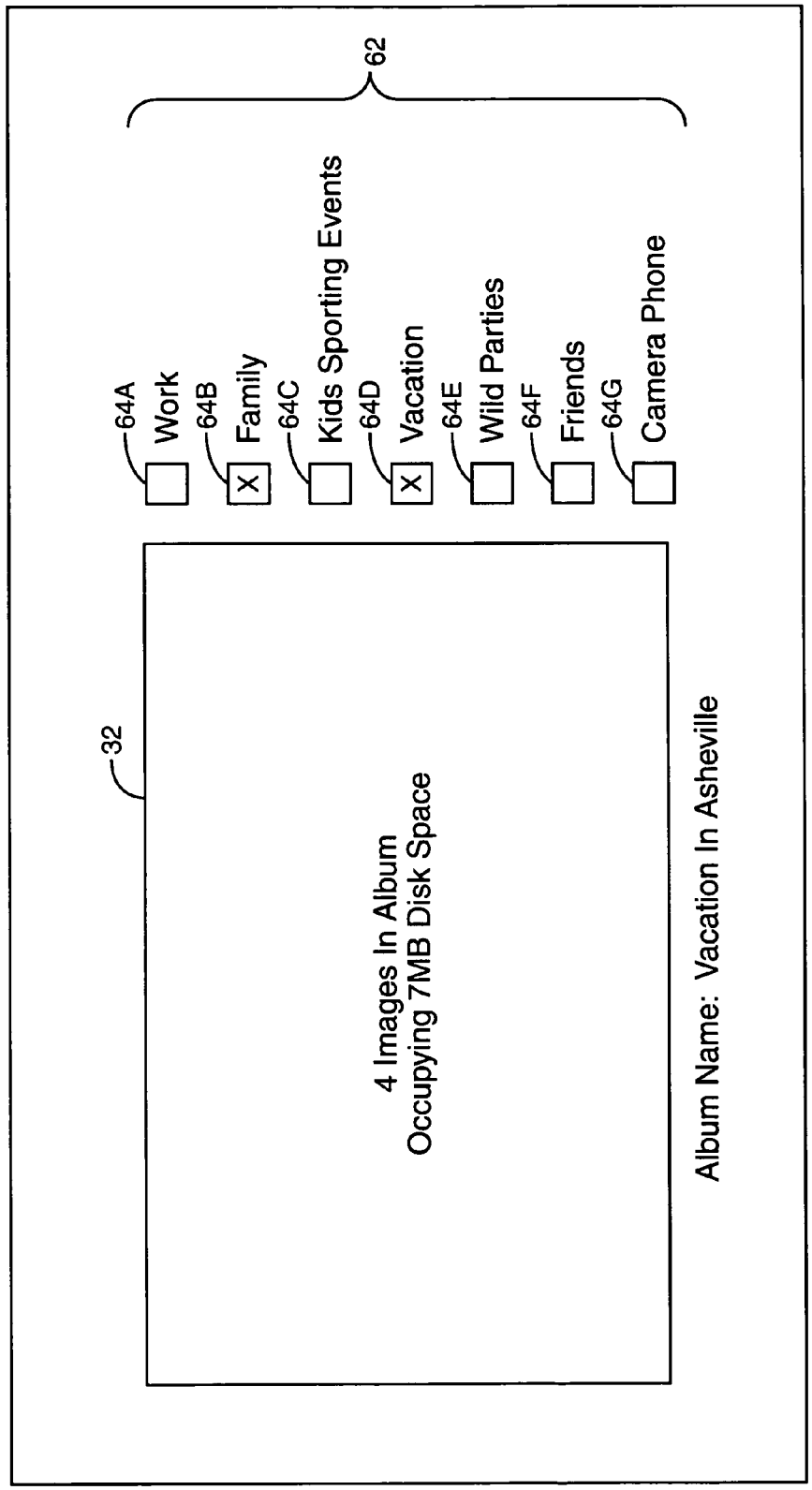
FIG. 4 illustrates an exemplary user interface for tagging each digital image in a photo album with one or more keywords on a per album basis.

FIG. 4 illustrates an exemplary user interface for tagging the digital images 36-50 with one or more keywords on a per album basis. More specifically, FIG. 4 illustrates tagging the digital images 36-42 within the photo album 32 with one or more keywords. As illustrated, the name of the photo album 32 is "Vacation in Asheville." The list 62 of the keywords is displayed to the user 20, and the user 20 selects which of the keywords are to be associated with the digital images 36-42 of the photo album 32 by, for example, checking the check boxes 64A-64G next to the desired keywords. In this example, check boxes 64B and 64D associated with the keywords "family" and "vacation" are checked, thereby selecting these keywords. Thereafter, the photo album 32 is associated with the selected keywords by, for example, storing the selected keywords in association with the photo album 32. For example, the selected keywords may be stored in a description of the photo album 32 in an application file associated with the client software 28.

Returning to FIG. 2, after tagging each of the digital images 36-50 with one or more keywords, the user 20 further interacts with the client software 28 to identify the list of archiving keywords and archival policies for each of the keywords (step 102). Note that step 102 may alternatively be performed before tagging the digital images 36-50. For each of the archiving keywords, the archival policies may include a priority for the keyword and an action for the central node 16 to take in order to prevent the user 20 from exceeding his allocated storage space at the central node 16. For example, the action to take may be moving the digital images tagged by the keyword to a secondary storage device; resizing or decreasing the resolution of the digital images tagged by the keyword; converting the digital images tagged by the keyword to a different file type and moving the converted digital images to a secondary storage device; deleting the digital images tagged by the keyword; or moving the digital images tagged by the keyword to a backup media such as a DVD, CD, or the like, and sending the media to the user 20.

Figure 5:
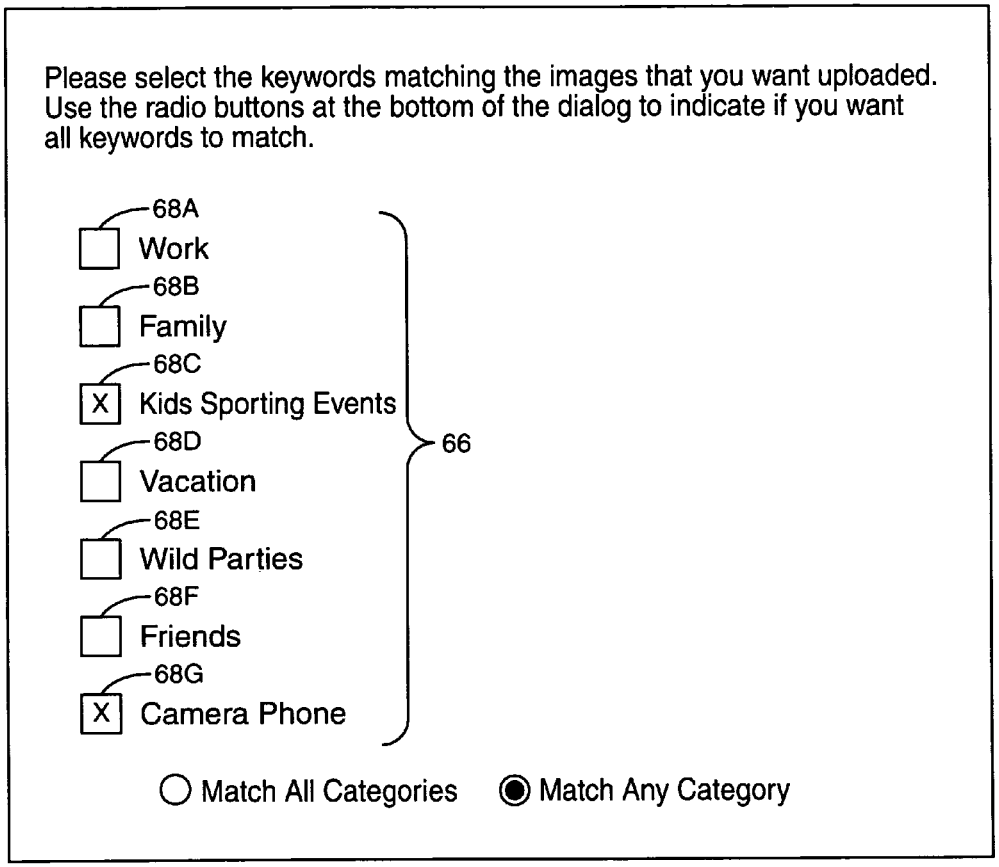
FIG. 5 illustrates an exemplary user interface for selecting one or more archiving keywords according to one embodiment of the present invention.

FIGS. 5-8 illustrate exemplary user interfaces for identifying the list of keywords to identify and the archival policies. FIG. 5 illustrates an exemplary user interface for identifying the list of archiving keywords. As shown, the user interface may include a list 66 of the keywords used to tag the digital images 36-50 and check box 68A-68G associated with the keywords. The archiving keywords are identified by checking ones of the check boxes 68A-68G associated with the desired keywords. In this example, the keywords "Kids Sporting Events" and "Camera Phone" are selected as the archiving keywords.

Figure 6:
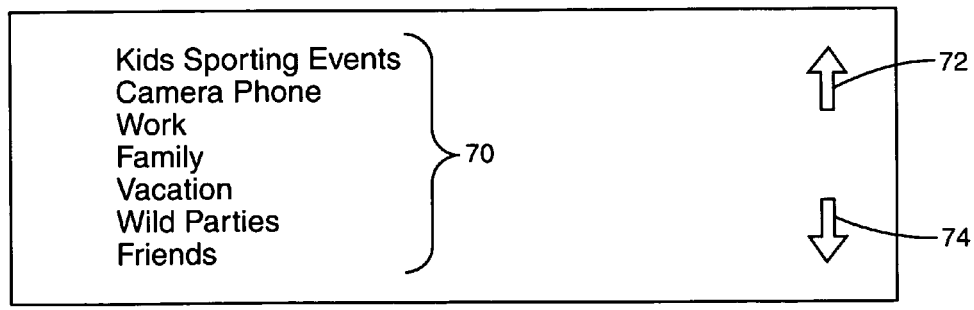
FIG. 6 illustrates an exemplary user interface for prioritizing the archiving keywords according to one embodiment of the present invention.

FIG. 6 illustrates an exemplary user interface for assigning a priority to each of the keywords in the list of archiving keywords. In this example, the user interface allows the user to create a prioritized list 70 of keywords. In this example, the prioritized list 70 includes all of the keywords used to tag the digital images 36-50. However, in another embodiment, the prioritized list 70 of keywords may include only the keywords in the list of archiving keywords. The keywords are prioritized by moving the higher priority keywords to the top of the prioritized list 70 using arrow 72 and moving lower priority keywords to the bottom of the prioritized list 70 using arrow 74. Thus, in this example, the keyword "Kids Sporting Events" is assigned the highest priority keyword and the keyword "Camera Phone" is assigned the second highest priority.

Figure 7:
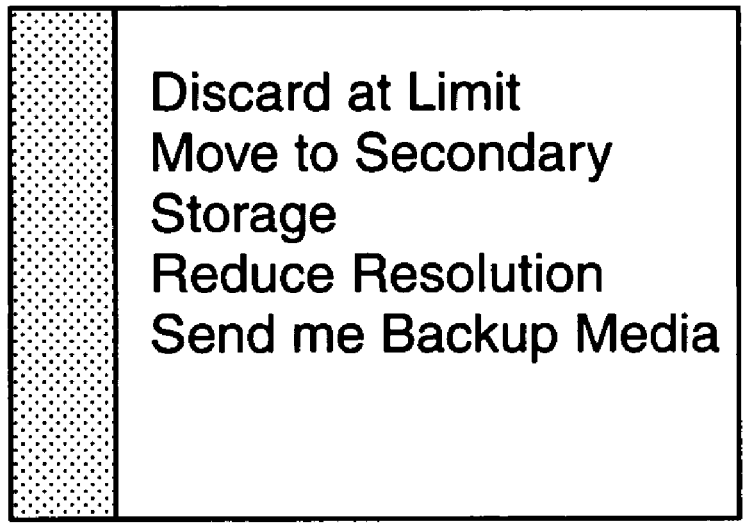
FIG. 7 illustrates an exemplary user interface for selecting an action for the central node of FIG. 1 to take for each keyword when necessary to prevent a storage limit from being exceeded according to one embodiment of the present invention.
Figure 8:
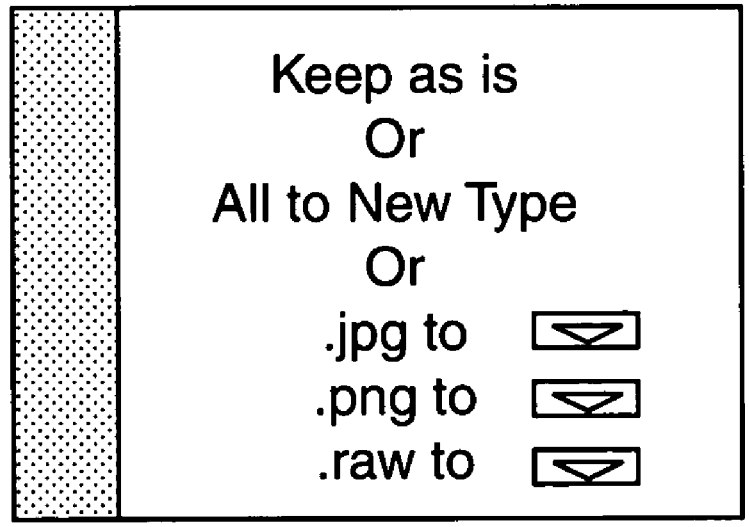
FIG. 8 illustrates an exemplary user interface for selecting whether digital assets are to be converted from a current format to another format when moving the digital assets to secondary storage or to a backup media.

FIG. 7 illustrates an exemplary user interface for selecting the action for the central node 16 to take in order to prevent the user 20 from exceeding his allocated storage space at the central node 16 for a particular keyword. Thus, for each keyword in the list of archiving keywords, the user 20 selects whether the digital images tagged with the keyword and stored at the central node 16 are to be deleted, moved to a secondary storage device, resized to reduce the resolution of the digital images, or moved to a backup media such as a DVD, CD, or the like, which is to be sent to the user 20. If the digital images are to be moved to a secondary storage device or stored on secondary media, the user 20 may also select whether the digital images are to remain in their current format or converted to a different format such as, but not limited to, the Joint Photographic Experts Group (JPEG) format or the Portable Networks Graphics (PNG) format. More specifically, the exemplary user interface of FIG. 8 illustrates that the user 20 may choose to have the digital images remain in the same format, convert all of the digital images to another format, or convert the digital images to another format based on the current format of the digital images.

Returning to FIG. 2, after the digital images 36-50 are tagged with keywords (step 100) and the list of archiving keywords and the archival policies are identified (step 102), the client node 12 sends the list of archiving keywords and the archival policies to the central node 16 (step 104). Thereafter, the central node 16, and more specifically the archival software 52, requests the digital images tagged with one or more of the keywords in the list of archiving keywords from the client node 12 (step 106). In response, the client software 28 at the client node 12 sends the storage space requirements for the requested digital images, which are the digital images to be uploaded from the client node 12 to the central node 16 (step 108).

The archival software 52 at the central node 16 then determines whether the storage space at the central node 16 allocated to the user 20, which may also be referred to as the user's storage limit, will be exceeded by the upload (step 110). For example, the user 20 may be allocated 1 Gigabyte (1 GB) of storage space in the storage unit 58 at the central node 16. Thus, the user's storage limit may be 1 GB. In order to determine whether the user's storage limit will be exceeded by the upload, the central node 16 determines whether the storage space currently used by the user 20 plus the storage space requirements for the upload is greater than the storage limit. If the storage limit will be exceeded by the upload, the central node 16 determines the action to take based on the archival policies for the archiving keywords and takes that action (step 112). In one embodiment, the archival software 52 first determines the action to take for the keyword having the lowest priority. For example, if the action to take is moving the digital images associated with the keyword to secondary storage, then the archival software 52 moves the digital images tagged with the lowest priority keyword to secondary storage, thereby reducing the storage space currently used. If the storage capacity will still be exceeded by the upload, the archival software 52 then determines the action to take for the next lowest priority keyword and continues the process until the storage capacity will no longer be exceeded by the upload.

Next, the digital images requested by the central node 16 are uploaded (step 114). In one embodiment, the archival software 52 at the central node 16 communicates with a background process, or daemon, running on the client node 12 to upload the digital images to the central node 16. The background process at the client node 12 operates to upload the digital images in the background without intervention by the user 20 such that the upload is transparent to the user 20. Once the upload is complete, the user 20 is notified that the upload, or archiving, is complete (step 116) and is optionally notified of the actions taken in step 112, if any.

Returning to step 110, if the storage limit will not be exceed by the upload, then the digital images are uploaded (step 114) and the user is notified when the upload is complete (step 116).

At this point, the archival software 52 at the central node 16 determines whether keywords have been added to the list of archiving keywords (step 118). In one embodiment, the archival software 52 polls the client node 12 to determine the list of archiving keywords and the archival policies such that the list of archiving keywords and archival policies stored at the central node 16 are updated. In another embodiment, the client software 28 sends the list of archiving keywords and archival policies to the central node 16 when a keyword is added or removed from the list of archiving keywords or when an archival policy is changed. In either case, if a keyword is added to the list of archiving keywords, the archival software 52 at the central node 16 requests the digital images tagged with the added keywords (step 120) and the process returns to step 108 where the client software 28 sends the storage space requirements for the requested digital images to the central node 16. From this point, the process continues as described above.

If no new keywords have been added, then the archival software 52 at the central node 16 determines whether there are new images to upload (step 122). More specifically, the archival software 52 determines whether there are new images that have been tagged with one or more of the archiving keywords since the last upload. In one embodiment, the client software 28 notifies the central node 16 when there are new images that have been tagged with one or more of the archiving keywords that need to be uploaded. In another embodiment, the archival software 52 polls the client node 12 to determine whether there are new images that have been tagged with one or more of the archiving keywords since the last upload. If there are new images to upload, the archival software 52 at the central node 16 requests the new images (step 124) and the process returns to step 108 where the storage space requirements for the requested images are sent from the client software 28 to the archival software 52. From this point, the process continues as described above. If there are no new images to upload, the process returns to step 118 where the archival software 52 determines whether new keywords have been added.

If a keyword is removed from the list of archiving keywords, several actions may be taken. For example, the digital images tagged with the removed keyword may remain stored on the central node 16 and continue to have the same archival policies as previously selected by the user 20. As another example, the digital images tagged with the removed keyword may remain stored on the central node 16 but have a reduced priority. As yet another example, the digital images tagged with the removed keyword may be moved to secondary storage, moved to a backup media to be sent to the user 20, or deleted.

Figure 9:
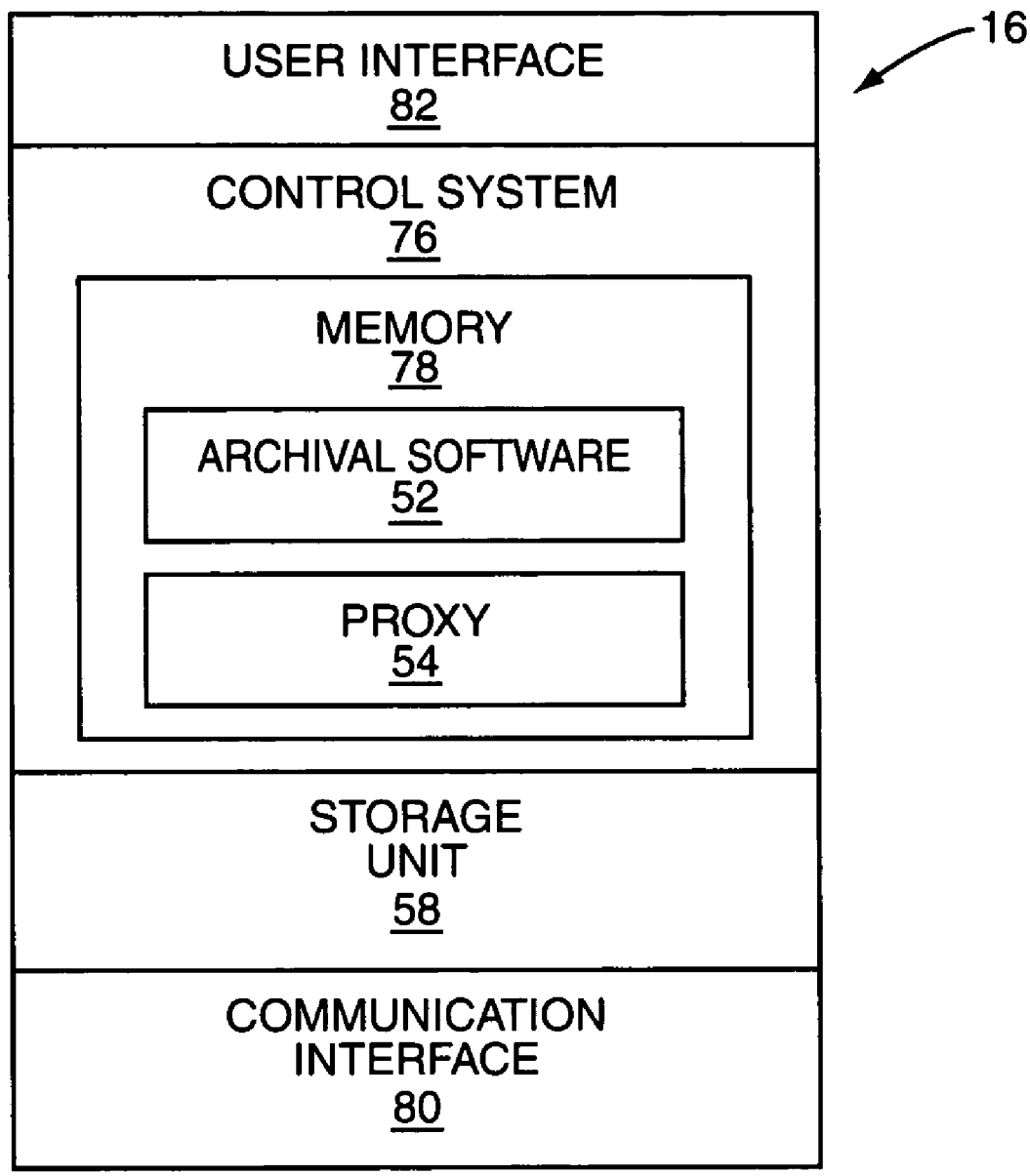
FIG. 9 is a basic block diagram of the central node of FIG. 1 according to one embodiment of the present invention.

FIG. 9 illustrates a basic block diagram of an exemplary embodiment of the central node 16. The central node 16 may generally include a control system 76 having associated memory 78. The memory 78 may store the archival software 52 and the proxy software 54. The central node 16 also includes the storage unit 58. As an example, the storage unit 58 may be one or more disc drives. The central node 16 may also include a communication interface 80 for communicating with other network entities via the network 26. The communication interface 80 may also include an interface to various external devices. A user interface 82 may also be provided and include a keypad, a mouse, a display, and the like (not shown).

Figure 10:
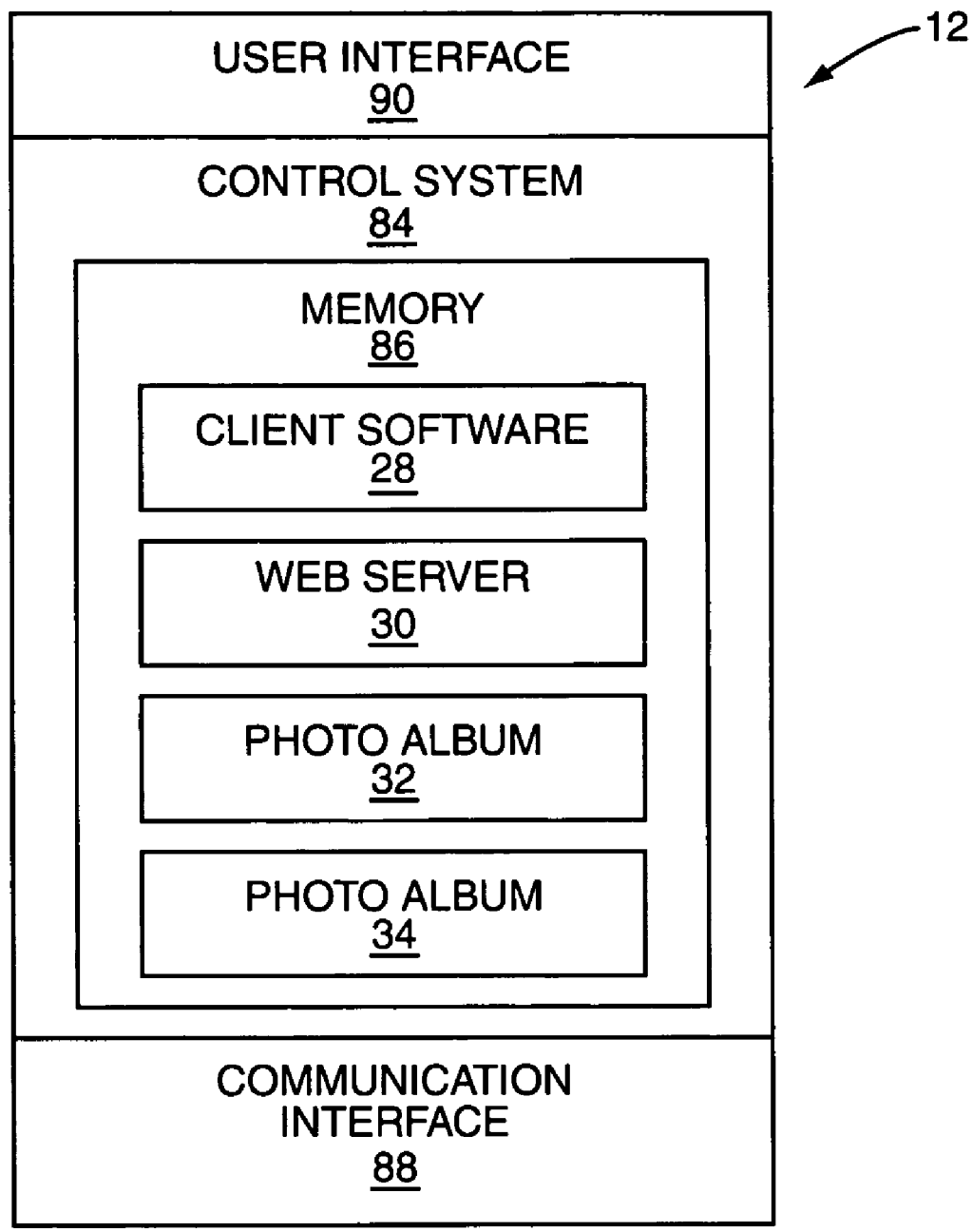
FIG. 10 is a basic block diagram of the client node of FIG. 1 according to one embodiment of the present invention.

FIG. 10 illustrates a basic block diagram of an exemplary embodiment of the client node 12. The client node 12 may generally include a control system 84 having associated memory 86. The memory 86 may store the client software 28, the web server 30, and the photo albums 32 and 34. The client node 12 may also include a communication interface 86 for communicating with other network entities via the network 22. The communication interface 88 may also include an interface to various external devices such as a printer. A user interface 90 may also be provided and include a keypad, a mouse, a display, and the like (not shown).

The present invention provides substantial opportunity for variation without departing from the spirit or scope of the present invention. For example, while the present invention is described above with respect to the P2P sharing system 10 (FIG. 1), the present invention is equally applicable to a centrally hosted sharing system. More specifically, the client node 12 and the central node 16 may be part of a centrally hosted digital asset sharing system, wherein the digital assets of numerous users are stored at the central node 16 and shared with guests. According to the present invention, the owner of the digital assets, which may be the user 20, tags the digital assets with keywords at the client node 12. Then, rather than identifying each individual asset to be uploaded to the central node 16, the user 20 may interact with the client node 12 to identify a list of archiving keywords or store at the central node 16. Then, based on the archiving keywords and optionally archival policies for the archiving keywords, the desired digital assets are uploaded to the central node 16, as described above.

Those skilled in the art will recognize improvements and modifications to the preferred embodiments of the present invention. All such improvements and modifications are considered within the scope of the concepts disclosed herein and the claims that follow.

What is claimed is:

1. A central node in a network based archiving system comprising:
   a) a communication interface coupled to a network;
   b) a storage unit having a predetermined storage limit; and
   c) a control system associated with the communication interface and the storage unit and configured to:
      i) receive a client list of archiving keywords from a client node, wherein a plurality of digital images in a photo album residing at the client node are tagged with a plurality of keywords and the client list of archiving keywords is created from the plurality of keywords;
      ii) store the client list of archiving keywords as a local list of archiving keywords;
      iii) request ones of the plurality of digital images tagged with at least one of the plurality of keywords in the client list of archiving keywords from the client node;
      iv) receive the ones of the plurality of digital images from the client node;
      v) store the ones of the plurality of digital images from the client node in the storage unit;
      vi) determine if the local list of archiving keywords should be updated by determining whether additional keywords have been added to the client list of archiving keywords, located at the client node, wherein the additional keywords are added when a digital image is tagged with a new keyword;
      vii) update the local list of archiving keywords if a determination is made that the additional keywords have been added to the client list of archiving keywords, located at the client node;
      viii) receive further digital images from the client node when the additional keywords have been added to the client list of archiving keywords;
      ix) determine whether there are additional digital images at the client node tagged with the at least one of the plurality of keywords in the client list of archiving keywords;
      x) request the additional digital images from the client node;
      xi) receive a storage space requirement for the additional digital images from the client node;
      xii) determine whether the predetermined storage limit will be exceeded based on the storage space requirement for the additional digital images;
      xiii) if the predetermined storage limit will be exceeded, perform an action selected from the group consisting of: deleting the ones of the plurality of digital images tagged with a keyword having a specified priority, reducing a resolution of the ones of the plurality of digital images tagged with the keyword having the specified priority, moving the ones of the plurality of digital images tagged with the keyword having the specified priority to a secondary storage device, and moving the ones of the plurality of digital images tagged with the keyword having the specified priority to a backup media to be sent to the owner of the plurality of digital images such that the predetermined storage limit will not be exceeded when the additional digital images are stored in the storage unit;
      xiv) receive the additional digital images from the client node; and
      xv) store the additional digital images in the storage unit.

2. The central node of claim 1 wherein the control system is further configured to determine whether there are additional digital images at the client node tagged with the at least one of the plurality of keywords in the client list of archiving keywords by polling the client node.

3. The central node of claim 1 wherein the control system is further configured to determine whether there are additional digital images at the client node tagged with the at least one of the plurality of keywords in the client list of archiving keywords based on receiving a notification from the client node.

4. The central node of claim 1 wherein the control system is further adapted configured to:
   receive an archival policy for each of the at least one of the plurality of keywords in the client list of archiving keywords from the client node; and
   determine the at least one action to perform based on the archival policy.

5. The central node of claim 4 wherein for each of the at least one of the plurality of keywords in the client list of archiving keywords, the archival policy comprises a priority of a keyword, wherein the action is performed on a digital image having a lowest priority keyword.

6. The central node of claim 5 wherein for each of the at least one of the plurality of keywords in the client list of archiving keywords, the archival policy comprises a desired action for the central node to perform for the ones of the plurality of digital images tagged with the keyword and stored in the storage unit when necessary to prevent the predetermined storage limit from being exceeded.

7. The central node of claim 6 wherein the central node is further configured to determine the at least one action to perform by selecting at least one of the desired actions from the archival policy based on priorities of the at least one of the plurality of keywords in the client list of archiving keywords such that the predetermined storage limit is not exceeded when the additional digital images are stored in the storage unit.

8. The central node of claim 1 wherein the control system is further configured to:
   receive at least one additional archiving keyword from the client node;
   request additional ones of the plurality of digital images tagged with the at least one additional archiving keyword from the client node;
   determine whether the predetermined storage limit will be exceeded based on a storage space requirement of the additional ones of the plurality of digital images;
   if the predetermined storage limit will be exceeded, perform the at least one action such that the predetermined storage limit will not be exceeded when the additional ones of the plurality of digital images are stored in the storage unit;
   receive the additional ones of the plurality of digital images from the client node; and store the additional ones of the plurality of digital images in the storage unit.

9. The central node of claim 8 wherein the control system is further configured to:
    receive an archival policy for each of the at least one of the plurality of keywords in the client list of archiving keywords from the client node; and
    determine the at least one action to perform based on the archival policy.

10. The central node of claim 9 wherein for each of the at least one of the plurality of keywords in the client list of archiving keywords, the archival policy comprises a priority of a keyword.

11. The central node of claim 10 wherein for each of the at least one of the plurality of keywords in the client list of archiving keywords, the archival policy comprises a desired action for the central node to perform for the ones of the plurality of digital images tagged with the keyword and stored in the storage unit when necessary to prevent the predetermined storage limit from being exceeded.

12. The central node of claim 11 wherein the central node is further configured to determine the at least one action to perform by selecting at least one of the desired actions from the archival policy based on priorities of the at least one of the plurality of keywords in the client list of archiving keywords such that the predetermined storage limit is not exceeded when the additional ones of the plurality of digital images are stored in the storage unit.

13. A computer implemented method for archiving digital images comprising:
    tagging each of a plurality of digital images in a photo album residing at a client node with at least one of a plurality of keywords;
    providing a client list of archiving keywords created from the plurality of keywords from the client node to a central node communicatively coupled to the client node via a network;
    storing the client list of archiving keywords as a local list of archiving keywords at the central node;
    providing a request for ones of the plurality of digital images tagged with the at least one of the plurality of keywords in the local list of archiving keywords from the central node to the client node;
    providing the ones of the plurality of digital images tagged with the at least one of the plurality of keywords in the client list of archiving keywords from the client node to the central node;
    storing the ones of the plurality of digital images tagged with the at least one of the plurality of keywords in the client list of archiving keywords at the central node, wherein the central node has a predetermined storage limit;
    determining if the local list of archiving keywords should be updated by determining whether additional keywords have been added to the client list of archiving keywords, located at the client node, wherein the additional keywords are added when a digital image is tagged with a new keyword;
    updating the local list of archiving keywords if a determination is made that the additional keywords have been added to the client list of archiving keywords, located at the client node;
    providing further digital images from the client node to the central node when the additional keywords have been added to the client list of archiving keywords;
    determining whether there are additional digital images at the client node tagged with the at least one of the plurality of keywords in the client list of archiving keywords;
    providing a request for the additional digital images tagged with the at least one of the plurality of keywords in the client list of archiving keywords from the central node to the client node;
    providing a storage space requirement for the additional digital images from the client node to the central node;
    determining whether the predetermined storage limit will be exceeded based on the storage space requirement of the additional digital images;
    if the predetermined storage limit will be exceeded, perform at least one action selected from the group consisting of: deleting the ones of the plurality of digital images tagged with a keyword having a specified priority, reducing a resolution of the ones of the plurality of digital images tagged with the keyword having the specified priority, moving the ones of the plurality of digital images tagged with the keyword having the specified priority to a secondary storage device, and moving the ones of the plurality of digital images tagged with the keyword having the specified priority to a backup media to be sent to the owner of the plurality of digital images such that the predetermined storage limit will not be exceeded when the additional digital images are stored in the storage unit;
    providing the additional digital images from the client node to the central node; and
    storing the additional digital images at the central node.

14. The computer implemented method of claim 13 wherein determining whether there are the additional digital images at the client node tagged with the at least one of the plurality of keywords in the client list of archiving keywords comprises polling the client node.

15. The computer implemented method of claim 13 wherein determining whether there are the additional digital images at the client node tagged with the at least one of the plurality of keywords in the client list of archiving keywords comprises a notification from the client node to the central node.

16. The computer implemented method of claim 13 wherein an owner of the plurality of digital images has a predetermined storage limit at the central node and the method further comprises:
    providing at least one additional archiving keyword from the client node to the central node;
    providing a request for additional ones of the plurality of digital images tagged with the at least one additional archiving keyword from the central node to the client node;
    providing a storage space requirement for the additional ones of the plurality of digital images from the client node to the central node;
    determining whether the predetermined storage limit will be exceeded based on the storage space requirement of the additional ones of the plurality of digital images;
    if the predetermined storage limit will be exceeded, performing at least one action such that the predetermined storage limit will not be exceeded when the additional ones of the plurality of digital images are stored in the central node;
    providing the additional ones of the plurality of digital images from the client node to the central node; and
    storing the additional ones of the plurality of digital images at the central node.

* * * * *